US012691706B2

(12) United States Patent
Resmini et al.

(10) Patent No.: US 12,691,706 B2
(45) Date of Patent: Jul. 28, 2026

(54) TYRE FOR VEHICLE WHEELS

(71) Applicant: Pirelli Tyre S.p.A., Milan (IT)

(72) Inventors: Emiliano Resmini, Milan (IT); Luca Bruschelli, Milan (IT); Daniele Matturro, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 18/688,646

(22) PCT Filed: Sep. 8, 2022

(86) PCT No.: PCT/IB2022/058456
§ 371 (c)(1),
(2) Date: Mar. 1, 2024

(87) PCT Pub. No.: WO2023/037281
PCT Pub. Date: Mar. 16, 2023

(65) Prior Publication Data
US 2024/0375440 A1 Nov. 14, 2024

(30) Foreign Application Priority Data
Sep. 9, 2021 (IT) ......................... 102021000023345

(51) Int. Cl.
*B60C 11/00* (2006.01)
*B60C 1/00* (2006.01)
(Continued)

(52) U.S. Cl.
CPC .......... *B60C 1/0016* (2013.01); *B60C 11/005* (2013.01); *C08K 3/04* (2013.01); *C08K 3/06* (2013.01); *C08K 3/36* (2013.01); *C08K 9/04*

(2013.01); *C08L 7/00* (2013.01); *C08L 9/00* (2013.01); *B60C 2011/0025* (2013.01); *C08K 2201/011* (2013.01); *C08L 2312/02* (2013.01)

(58) Field of Classification Search
CPC ...................... B60C 11/005; B60C 2011/0025
See application file for complete search history.

(56) References Cited

U.S. PATENT DOCUMENTS 4,742,124 A 5/1988 Tsutsumi et al.
2014/0196825 A1 7/2014 Nahmias Nanni et al.
(Continued)

FOREIGN PATENT DOCUMENTS

EP 435620 A * 7/1991
EP 0451604 A2 10/1991
(Continued)

OTHER PUBLICATIONS

Translation for Japan 03-007602 (Year: 2025).*
(Continued)

*Primary Examiner* — Steven D Maki
(74) *Attorney, Agent, or Firm* — Finnegan, Henderson, Farabow, Garrett & Dunner, L.L.P.

(57) ABSTRACT

The present invention relates to a tyre (100) comprising a particular elastomeric compound in the underlayer (111), i.e. in the layer arranged between the tread band (109) and the belt structure (106) of the tyre.
According to the invention, the tyre has a considerably reduced rolling resistance compared to known tyres, and at the same time, good road grip, excellent maneuverability and comfort.

20 Claims, 1 Drawing Sheet

(51) Int. Cl.

| | | |
|---|---|---|
| *C08K 3/04* | (2006.01) |
| *C08K 3/06* | (2006.01) |
| *C08K 3/36* | (2006.01) |
| *C08K 9/04* | (2006.01) |
| *C08L 7/00* | (2006.01) |
| *C08L 9/00* | (2006.01) |

(56) References Cited

U.S. PATENT DOCUMENTS

| | | | |
|---|---|---|---|
| 2015/0165821 A1 | 6/2015 | Nahmias Nanni et al. |
| 2015/0239296 A1* | 8/2015 | Fukuda ............... B60C 11/0041 |
| | | | 152/209.5 |
| 2017/0326844 A1 | 11/2017 | Silva et al. |
| 2018/0072099 A1 | 3/2018 | Giannini et al. |
| 2019/0255887 A1* | 8/2019 | Perrin ................. B60C 11/0066 |
| 2020/0181356 A1 | 6/2020 | Barbouteau et al. |
| 2020/0299482 A1* | 9/2020 | Giannini ............... B60C 1/0016 |

FOREIGN PATENT DOCUMENTS

| | | | | |
|---|---|---|---|---|
| EP | 2714426 | A1 | | 12/2014 |
| IT | 201600108318 | A | | 10/2016 |
| JP | 03-007602 | A | * | 1/1991 |
| JP | 04-278807 | A | * | 10/1992 |
| WO | 2009134665 | A2 | | 11/2009 |
| WO | 2009148932 | A1 | | 12/2009 |
| WO | 2010107555 | A1 | | 9/2010 |
| WO | 2012164433 | A1 | | 12/2012 |
| WO | 2014040640 | A1 | | 3/2014 |
| WO | 2015043660 | A1 | | 4/2015 |
| WO | 2015086039 | A1 | | 6/2015 |
| WO | 2016050887 | A1 | | 4/2016 |
| WO | 2016174628 | A | | 11/2016 |
| WO | 2016174629 | A1 | | 11/2016 |
| WO | 2017211876 | A1 | | 12/2017 |
| WO | 2018078480 | A1 | | 5/2018 |
| WO | 2018078500 | A1 | | 5/2018 |
| WO | 2019106562 | A1 | | 6/2019 |
| WO | 2019229692 | A1 | | 12/2019 |

OTHER PUBLICATIONS

Machine translation for Japan 04-278807 (Year: 2025).*

International Search Report form the European Patent Office in corresponding International Application No. PCT/IB2022/058456 mailed Jan. 9, 2023.

Written Opinion of the International Searching Authority from the European Patent Office in corresponding International Application No. PCT/IB2022/058456 mailed Jan. 9, 2023.

* cited by examiner

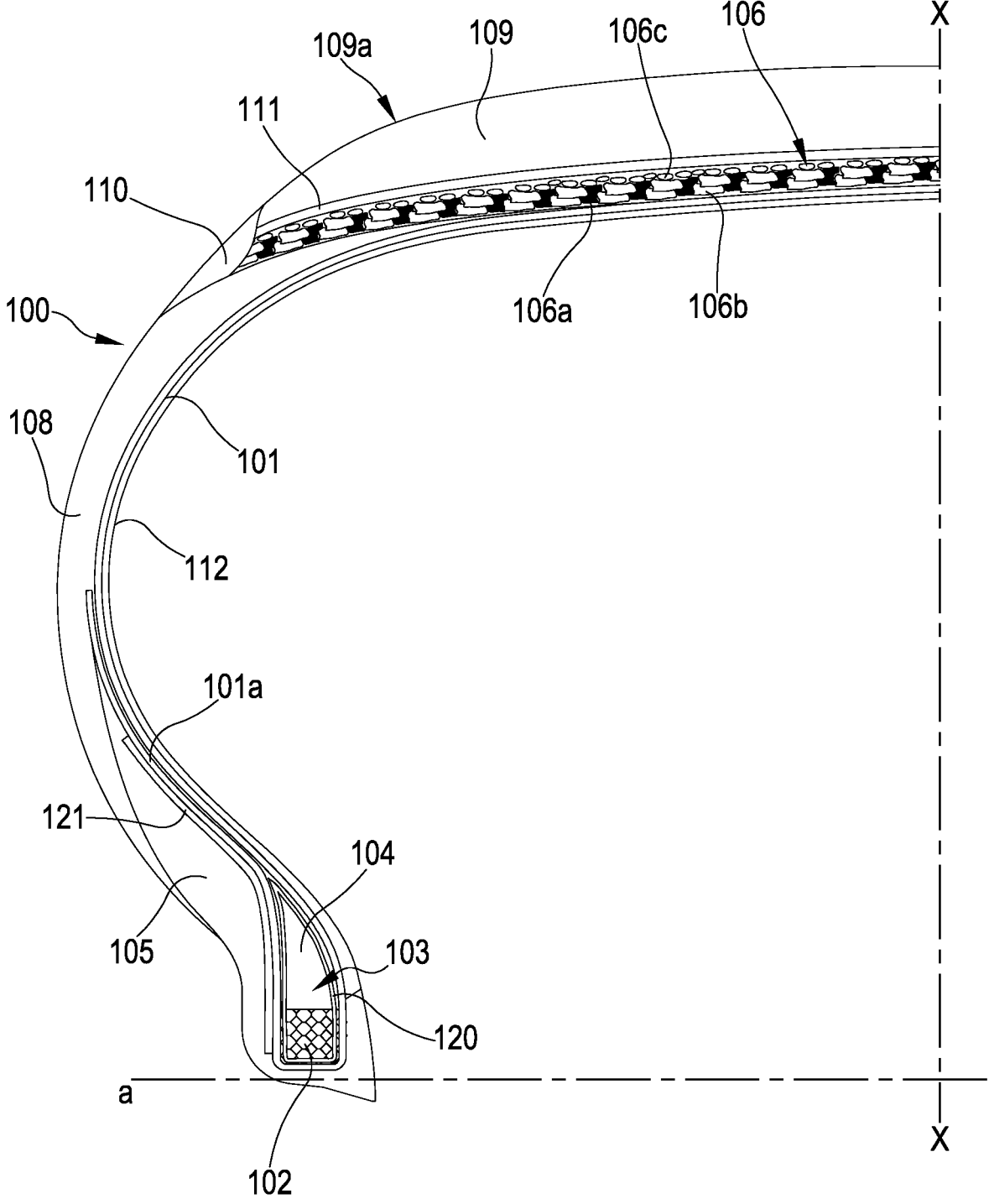

TYRE FOR VEHICLE WHEELS

This application is a national stage entry application under 35 U.S.C. § 371 of International Application No. PCT/IB2022/058456, filed on Sep. 8, 2022, and claims priority to Italian Application No. 102021000023345, filed Sep. 9, 2021; the contents of each application is incorporated herein by reference in its entirety.

FIELD OF THE INVENTION

The present invention relates to a tyre comprising a particular elastomeric compound in the layer arranged between the tread band and the belt structure or underlayer.

According to the invention, the tyre has a considerably reduced rolling resistance compared to known tyres and an improved maneuverability, while maintaining good road grip and comfort.

PRIOR ART

The tyre industry requires ever higher performance standards, relating both to tyre grip in normal driving conditions, on dry and wet roads, and to vehicle safety during emergency maneuvers, such as maneuvering to avoid an obstacle, high-speed lane change or emergency braking.

In addition, the market's attention is progressively increasingly shifting towards a reduction in rolling resistance (RR) and in consumption.

Behind the concept of reducing rolling resistance there are on the one hand eco-friendliness reasons, as it is a parameter linked to vehicle emissions and, on the other hand, regulatory and homologation reasons.

In fact, regulatory bodies limit the maximum permissible rolling resistance value for a tyre.

For example, in order to obtain ECE approval for the European market, European legislation (EU regulation 117 of 2011) provides for a maximum limit of the rolling resistance coefficient of 10.5 N/kN.

Class A, which identifies tyres with the lowest rolling resistance, is characterised by a maximum rolling resistance coefficient of 6.5 N/kN.

In addition, the EU 2020/740 regulation, which entered into force on May 1, 2021, introduces new rules on the energy labelling of road tyres also based on RR values.

In these labels, the rolling resistance indication is an indicator of the tyre's energy efficiency-both in terms of lower fuel consumption and the extent of the distance that can be covered by electric vehicles between charging points. The quantity of wet grip is an obvious safety indication, however, it does not easily go hand in hand with more efficient rolling resistance.

Finally, as mentioned above, for electric vehicle manufacturers, rolling resistance, both in "laboratory-regulated" conditions and in real conditions, is a fundamental parameter that can be linked to the vehicle's autonomy. In fact, the correlation between the rolling resistance of tyres and the consumption of batteries in electric cars is well known.

Therefore, it is apparent from the foregoing that it is necessary to increasingly reduce the rolling resistance of the tyres without penalising other performances.

US20200181356 (A1) describes an elastomeric composition for internal layers of tyres with improved rolling resistance comprising a particular carbon black, characterized by a specific BET surface area of less than 70 m²/g and/or a COAN coefficient of less than 90 ml/100 g, and silica. The exemplified compositions (Table 1) comprise a total of 55 to 67 phr of reinforcing fillers and show lower Tan delta values than those of a similar reference composition comprising 55 phr of a conventional carbon black. Neither modulus values of the materials nor actual maneuverability or comfort data on tyres are reported.

US2017326844 (A1) deals with the problem of adhesion between different elastomeric compositions of the tread band and the underlayer and describes a tyre comprising an elastomeric laminate consisting of layers A, B and several intermediate layers C, wherein layer A is present in the tread and layer B in the underlayer. The composition of the underlayer B preferably comprises reinforcing material in an unspecified amount (par. 133) and the only one exemplified (Table 1) contains 30 phr of carbon black. The modulus values of the materials are not reported.

EP2714426 (A1) in the name of the Applicant, describes a tyre for vehicle wheels, comprising an underlayer of elastomeric material comprising inorganic fibres of magnesium and/or aluminium silicates of nanometric dimensions together with other fillers. EP2714426 (A1) describes that the addition of the inorganic fibres of nanometric dimensions in the tyre underlayer improves the performance of the tyre, especially the rear, under extreme driving conditions. The document does not mention the problem of tyre rolling resistance and indeed states that for those materials comprising silicate fibres there is an increase in hysteresis (comment to Table 2 par. 90 and Table 5 par. 112). The underlayer compositions exemplified herein (Ex. 1-6) comprise reinforcing fillers in a total amount of at least 57 phr and have G' values of at least 3 MPa (Ex. 1-2, Table 2). The teaching of this document has been reported in the present experimental part (reference composition 3).

The underlayer (base), placed between the tread band (cap) and the belt structure, is a key element for the structural integrity of the tyre, especially in conditions of fatigue and high speed, since, in direct contact with the belt, it is subjected to significant effort cycles. The underlayer contributes directly to the cornering stiffness, handling and steering of the tyre as it transfers the cutting forces from the belt to the tread compound according to its properties in terms of elastic moduli.

Furthermore, the underlayer directly influences the comfort perceived by the driver as it is responsible for transmitting the stresses from the tread to the belts and, ultimately, to the vehicle. A compound that is too rigid may be critical for the excessive transmission of impacts to the car body; a compound with low hysteresis, although advantageous for its lower rolling resistance, may be problematic in terms of poor damping of impacts and excessive vibrations transmitted to the car body.

In light of the prior art, there remains the need to provide a tyre that has a reduced rolling resistance compared to tyres currently in use and that at the same time maintains good grip on the road, both dry and wet, giving stability to the vehicle.

It is also necessary to have a tyre that has the aforementioned features and that, on impact with the road surface, is able to dampen blows and provide comfort to the driver.

SUMMARY OF THE INVENTION

The Applicant has posed the problem of how to reduce the rolling resistance of a tyre, and therefore fuel consumption, thereby improving the environmental impact thereof. Achieving this objective without introducing worsening of the other performances, especially without penalising the road grip in all conditions, the mileage and the comfort in general seemed particularly challenging. The situation was even more complex considering specific tyres which, due to their wide and low profile sizes, or to the application, for all seasons with winter marking, are by themselves characterised by a higher rolling resistance.

The Applicant has found that by intervening on the composition of the underlayer, it is possible to reconcile the need to give the tyre an even more reduced rolling resistance, maintaining the desired features of excellent road grip required by the car manufacturers and the comfort and, unexpectedly, improving driving performance.

This result was surprisingly obtained by manufacturing said underlayer with an elastomeric compound which, once vulcanised, has a shear modulus value G' of less than 0.90 MPa, a dynamic elastic compression modulus value E' comprised between 3.00 and 8.00 MPa and a dynamic viscous compression modulus value E" of less than 0.24 MPa.

The Applicant has found that it is possible to obtain a compound with these peculiar dynamic mechanical properties, in particular with a high E' together with such a reduced G', for example by incorporating silicate fibres among the reinforcing fillers into the compound and, at the same time, considerably limiting the total content of said reinforcing fillers.

The insertion of the present compound in the underlayer has allowed a completely surprising improvement to be obtained in the performance of the tyre compared to what has been taught by the prior art.

In fact, reducing the rolling resistance of a tyre typically worsens its performance on the road, especially grip.

Instead, the Applicant has observed that, by incorporating the aforementioned compound into the underlayer, a tyre is unexpectedly obtained which not only has a considerably reduced rolling resistance but also good features of road grip and behaviour, handling, braking and comfort perception. Particularly surprising were the increased handling and the maintenance of the damping and therefore of the comfort, which instead were expected to worsen considering the high elasticity of the compound (high E' values).

The present invention therefore relates to a tyre for vehicle wheels comprising:

a carcass structure having opposing side edges associated with respective annular anchoring structures;

a belt structure applied in a position radially external to the carcass structure;

a tread band applied in a position radially external to the belt structure;

a pair of sidewall structures each including a sidewall extended in a position axially external to the carcass structure and extended radially between one of the annular anchoring structures and an axially external portion of the tread band; and at least one layer of elastomeric material or underlayer applied in a radially internal position with respect to said tread band and radially external with respect to said belt structure, characterised in that said at least one underlayer comprises a vulcanised elastomeric compound having a shear modulus value G', measured at 70° C., 10 Hz, 9% strain according to the RPA method disclosed in the present description, of less than 0.90 MPa, a dynamic elastic compression modulus value E' comprised between 3.00 and 8.00 MPa and a dynamic viscous compression modulus value E" of less than 0.24 MPa, said moduli E' and E" being measured at 23° C. with an Instron model 1341 dynamic device in the tension-compression mode on cylindrical samples of 25 mm in length and 14 mm in diameter, cross-linked at 170° C. for 10 minutes, longitudinally pre-compressed by 25% and subjected to a dynamic sinusoidal stress of ±3.5% of amplitude and 10 Hz of frequency, as described in the present experimental part.

Preferably, said vulcanised elastomeric compound is prepared by mixing and vulcanising a composition comprising at least 100 phr of at least one diene elastomeric polymer, one or more reinforcing fillers in a total amount of not more than 25 phr, wherein said fillers comprise at least 5 phr of optionally modified silicate fibres with needle-shaped morphology of nanometric dimensions, and at least 0.1 phr of at least one vulcanisation agent.

The Applicant has therefore observed that by applying at least one underlayer of the elastomeric compound described herein between the tread band and the belt structure, it is possible to obtain tyres which advantageously have improved performance not only in normal driving but also during use in challenging conditions such as in sports driving.

Definitions

The term "underlayer" means a layer of elastomeric material positioned radially inside the tread band and outside the tyre belt structure.

The term "composition for tyre compound" means a composition comprising at least one diene polymer and one or more additives, which by mixing and possible heating provides an elastomeric compound suitable for use in tyres and their components.

The components of said composition are not generally introduced simultaneously into the mixer but typically added in sequence. In particular, the vulcanisation additives, such as the vulcanisation agent and possibly the accelerant and retardant agents, are usually added in a downstream step with respect to the incorporation and processing of all the other components.

In the final vulcanisable compound, the individual components of the elastomeric composition may be altered or no longer individually traceable as modified, completely or in part, due to the interaction with the other components, of heat and/or mechanical processing.

"Composition for tyre compound" herein is meant to include all the components that are used in the preparation of the elastomeric compound, regardless of whether they are actually present simultaneously, are introduced sequentially or are then traceable in the final elastomeric compound or tyre.

The term "elastomeric compound" indicates the compound obtainable by mixing and possibly heating at least one diene polymer with at least one of the additives commonly used in the preparation of tyre compounds.

The term "cross-linkable elastomeric compound" indicates the elastomeric compound ready for cross-linking, obtainable by incorporation into a non-cross-linkable elastomeric compound of all the additives, including the cross-linking ones.

The term "cross-linked vulcanised compound" means the material obtainable by cross-linking of a cross-linkable elastomeric compound.

The term "green" indicates a material, a compound, a composition, a component or a tyre not yet cross-linked.

The term "cross-linking" means the reaction of forming a three-dimensional lattice of inter- and intra-molecular bonds in a natural or synthetic rubber.

The term "cross-linking agent" indicates a product capable of transforming natural or synthetic rubber into elastic and resistant material due to the formation of a three-dimensional network of inter- and intra-molecular bonds.

The term "vulcanisation" refers to the cross-linking reaction in a natural or synthetic rubber induced by a sulphur-based cross-linking agent.

The term "vulcanisation agent" means a sulphur-based cross-linking agent such as elemental sulphur, polymeric sulphur, sulphur donor agents such as bis [(trialkoxysilyl) propyl]polysulphides, thiurams, dithiodimorpholines and caprolactam-disulphide.

The term "vulcanisation accelerant" means a compound capable of decreasing the duration of the vulcanisation process and/or the operating temperature, such as TBBS, sulphenamides in general, thiazoles, dithiophosphates, dithiocarbamates, guanidines, as well as sulphur donors such as thiurams.

The term "vulcanisation activating agent" indicates a product capable of further facilitating the vulcanisation, making it happen in shorter times and possibly at lower temperatures. An example of activating agent is the stearic acid-zinc oxide system.

The term "vulcanisation retardant" means a product capable of delaying the onset of the vulcanisation reaction and/or suppressing undesired secondary reactions, for example N-(cyclohexylthio) phthalimide (CTP).

The term "vulcanisation package" is meant to indicate the vulcanisation agent and one or more vulcanisation additives selected from among vulcanisation activating agents, accelerants and retardants.

The term "diene polymer" indicates a polymer derived from the polymerisation of one or more monomers, of which at least one is a conjugated diene.

The term "elastomeric diene polymer" indicates a natural or synthetic diene polymer which, after cross-linking, can be stretched repeatedly at room temperature to at least twice its original length and after removal of the tensile load substantially immediately returns with force to approximately its original length (according to the definitions of the ASTM D1566-11 Standard terminology relating to Rubber).

The term "reinforcing filler" is meant to refer to a reinforcing material typically used in the sector to improve the mechanical properties of tyre rubbers, preferably selected from among carbon black, conventional silica, such as silica from sand precipitated with strong acids, preferably amorphous, diatomaceous earth, calcium carbonate, titanium dioxide, talc, alumina, aluminosilicates, kaolin, silicate fibres with needle-shaped morphology of nanometric dimensions and mixtures thereof.

The term "white filler" refers to a reinforcing material used in the sector preferably selected from precipitated amorphous silica, amorphous silica of natural origin, such as diatomaceous earth, calcium carbonate, titanium dioxide, talc, alumina, kaolin and mixtures thereof, and lamellar or fibrous silicates, such as sepiolite, paligorskite also known as attapulgite, montmorillonite, alloisite and the like, possibly modified by acid treatment and/or derivatised. Typically, white fillers have surface hydroxyl groups.

The term "fibres with needle-shaped morphology" means fibres having a dimension (length) much greater than the diameter or the maximum cross-sectional dimension.

The expression "nanometric dimensions" referred to fibres means that the fibres have a diameter or maximum cross-sectional dimension of less than 500 nm.

The silicate fibres with needle-shaped morphology differ from lamellar silicates, such as bentonite, alloisite, vermiculite or hydrotalcite, at least in the average aspect ratio. More particularly, considering a particle having three dimensions a, b, c where a>b>c, a particle can be defined lamellar when $(3 \times a/b) < b/c$, while a particle can be defined needle-shaped when $(2 \times a/b) > b/c$.

In the present context, the term "silicate fibres with needle-shaped morphology of nanometric dimensions" generally means also modified fibres, i.e. the fibres obtainable from silicate fibres with needle-shaped morphology of nanometric dimensions by reaction of partial acid degradation, partial removal of magnesium, derivatisation-such as salification with organic compounds or silanisation, or superficial deposition of other compounds, for example amorphous silica.

Finally, the term "silicate fibres with needle-shaped morphology of nanometric dimensions" also includes possible mixtures of one or more of said fibres and/or one or more of said modified fibres.

The term "mixing step (1)" indicates the step of the preparation process of the elastomeric compound in which one or more additives may be incorporated by mixing and possibly heating, except for the vulcanisation agent which is fed in step (2). The mixing step (1) is also referred to as "non-productive step". In the preparation of a compound there may be several "non-productive" mixing steps which may be indicated with 1a, 1b, etc.

The term "mixing step (2)" indicates the next step of the preparation process of the elastomeric compound in which the vulcanisation agent and, possibly, the other additives of the vulcanisation package are introduced into the elastomeric compound obtained from step (1), and mixed in the material, at controlled temperature, generally at a temperature of compound than 120° C., so as to provide the vulcanisable elastomeric compound. The mixing step (2) is also referred to as "productive step".

The term "conventional cross-linking process" means a process in which the cross-linking of the compound essentially takes place by vulcanisation with sulphur-based vulcanisation agents.

For the purposes of the present description and the following claims, the term "phr" (acronym for parts per hundreds of rubber) indicates the parts by weight of a given elastomeric compound component per 100 parts by weight of the diene polymer, net of any plasticising extension oils.

Unless otherwise indicated, all the percentages are expressed as percentages by weight.

BRIEF DESCRIPTION OF THE FIGURE

FIG. 1 schematically shows a semi-sectional view of a tyre for vehicle wheels according to the present invention.

DETAILED DESCRIPTION OF THE INVENTION

The present invention can have one or more of the preferred features set out below.

They may be combined as desired according to the application requirements.

The present invention preferably relates to a tyre for vehicle wheels comprising:

a carcass structure having opposing side edges associated with respective annular anchoring structures;

a belt structure applied in a position radially external to the carcass structure;

a tread band applied in a position radially external to the belt structure;

a pair of sidewall structures each including a sidewall extended in a position axially external to the carcass structure and extended radially between one of the annular anchoring structures and an axially external portion of the tread band; and at least one layer of elastomeric material or underlayer applied in a radially internal position with respect to said tread band and radially external with respect to said belt structure, characterised in that said at least one underlayer comprises a vulcanised elastomeric compound having a shear modulus value G' measured at 70° C., 10 Hz, 9% strain according to the RPA method disclosed in the present description of less than 0.87 MPa, a dynamic elastic compression modulus value E' comprised between 3.50 and 7.50 MPa and a dynamic viscous compression modulus value E" of less than 0.23 MPa, said moduli E' and E" being measured at 23° C., 10 Hz, as described in the present experimental part.

The vulcanised elastomeric compound has a shear modulus value G' preferably in the range between 0.50 MPa and 0.90 MPa, more preferably between 0.70 and 0.90 MPa.

The vulcanised elastomeric compound has a shear modulus value G' preferably higher than 0.50 MPa, more preferably higher than 0.60 MPa.

Preferably, said vulcanised elastomeric compound has a dynamic elastic compression modulus value E' of less than 7.50 MPa, more preferably less than 6.00 MPa measured at 23° C., 10 Hz according to the method reported in the present description.

The vulcanised elastomeric compound has a dynamic elastic compression modulus value E' preferably comprised between 3.50 and 7.50 MPa, more preferably between 3.90 and 6.00 MPa.

Preferably, said vulcanised elastomeric compound has a dynamic viscous compression modulus value E" of less than 0.23 MPa, more preferably less than 0.22 MPa, even more preferably less than 0.21 MPa measured at 23° C., 10 Hz according to the method reported in the present description.

The vulcanised elastomeric compound has a dynamic viscous compression modulus value E" preferably comprised between preferably in the range from 0.15 to 0.24 MPa, more preferably from 0.16 to 0.22 MPa, even more preferably comprised between 0.17 and 0.21 MPa.

In a particularly preferred embodiment, said at least one underlayer comprises a vulcanised elastomeric compound having a shear modulus value G' measured at 70° C., 10 Hz, 9% strain according to the RPA method disclosed in the present description not higher than 0.85 MPa, a dynamic elastic compression modulus value E' comprised between 3.80 and 5.30 and a dynamic viscous compression modulus value E" of less than 0.22 MPa, said moduli E' and E" being measured as described in the present experimental part.

The vulcanised elastomeric compound has a Tan Delta value preferably of less than 0.0650, more preferably less than 0.060, even more preferably less than 0.055 measured at 70° C., 10 Hz, 9% deformation according to the RPA method reported in the present description.

The vulcanised elastomeric compound has a Tan Delta value preferably in the range from 0.030 to 0.065, more preferably from 0.035 to 0.060, even more preferably from 0.040 to 0.055 measured at 70° C., 10 Hz, 9% deformation according to the RPA method reported in the present description.

The vulcanised elastomeric compound of the tyre underlayer of the present invention may be further characterized by the following additional dynamic and static mechanical properties.

The vulcanised elastomeric compound has an elongation at break value AR (%) preferably higher than 150%, more preferably higher than 200%, even more preferably higher than 230% measured according to the UNI 6065:2001 method.

The vulcanised elastomeric compound has a tensile strength value CR preferably of at least 5.0 MPa, preferably at least 7.0 MPa, more preferably at least 8.0 MPa, measured according to the UNI6065: 2001 method.

The vulcanised elastomeric compound has a tensile strength value CR preferably in the range from 6.0 to 25.0 MPa, preferably from 7.0 to 20.0 MPa, measured according to the UNI6065: 2001 method.

In the tyre of the present invention, the underlayer composition of the present tyre described herein is used to form the at least one underlayer.

Preferably, said at least one underlayer comprises at least 50%, 60%, 70%, 80% or more preferably at least 90% by weight of the elastomeric compound as defined herein.

In a preferred embodiment, said at least one underlayer comprises at least 95% by weight of the elastomeric compound as defined herein.

In a more preferred embodiment, the tyre underlayer entirely consists of the present elastomeric compound.

Preferably, the tyre according to the invention comprises a single underlayer, more preferably a single underlayer entirely consisting of the present elastomeric compound.

Preferably, said underlayer is in contact with the tread band.

The underlayer comprising the elastomeric compound described herein may have different shapes and thicknesses.

Preferably, said thickness is comprised between 0.5 mm and 3 mm, more preferably between 1.5 and 2.5 mm.

The thickness of the underlayer may also vary between the centre and the shoulder of the tyre as a function of the distribution of the under-imprint dissipations.

Preferably, said underlayer elastomeric compound is prepared by mixing and vulcanising a composition comprising at least 100 phr of at least one diene elastomeric polymer, one or more reinforcing fillers in a total amount of not more than 25 phr and not less than 10 phr, wherein said fillers comprise at least 6 phr of optionally modified silicate fibres with needle-shaped morphology of nanometric dimensions, and at least 0.1 phr of at least one vulcanisation agent.

In one embodiment, said composition comprises one or more reinforcing fillers in a total amount not higher than 23 phr or 20 phr or 16 phr.

In one embodiment, said fillers comprise at least 7 phr or at least 8 phr or at least 10 phr of silicate fibres with needle-shaped morphology of nanometric dimensions, possibly modified.

The present underlayer composition of the present tyre comprises at least 100 phr of at least one diene elastomeric polymer.

The diene elastomeric polymer may be selected from those commonly used in sulphur-vulcanisable elastomeric compositions, which are particularly suitable for producing tyres, i.e. from among solid elastomeric polymers or copolymers with an unsaturated chain having a glass transition temperature (Tg) generally lower than-20° C., preferably in the range from −40° C. to −110° C.

These polymers or copolymers may be of natural origin or may be obtained by solution polymerization, emulsion polymerization or gas-phase polymerization of one or more conjugated dienes, optionally mixed with at least one comonomer selected from monoolefins, monovinylarenes and/or polar comonomers in an amount not exceeding 60% by weight.

The conjugated dienes generally contain from 4 to 12, preferably from 4 to 8 carbon atoms and may be selected, for example, from the group comprising: 1,3-butadiene, iso-prene, 2,3-dimethyl-1,3-butadiene, 1,3-pentadiene, 1,3-hexadiene, 3-butyl-1,3-octadiene, 2-phenyl-1,3-butadiene and mixtures thereof.

The monoolefins may be selected from ethylene and α-olefins generally containing from 3 to 12 carbon atoms, such as for example propylene, 1-butene, 1-pentene, 1-hexene, 1-octene or mixtures thereof.

Monovinylarenes, which may optionally be used as comonomers, generally contain from 8 to 20, preferably from 8 to 12 carbon atoms and may be selected, for example, from: styrene; 1-vinylnaphthalene; 2-vinylnaphthalene; various alkyl, cycloalkyl, aryl, alkylaryl or arylalkyl deriva-tives of styrene, such as, for example, α-methylstyrene, 3-methylstyrene, 4-propylstyrene, 4-cyclohexylstyrene, 4-dodecylstyrene, 2-ethyl-4-benzylstyrene, 4-p-tolyl-sty-rene, 4-(4-phenylbutyl) styrene, and mixtures thereof. Sty-rene is particularly preferred.

Polar comonomers that may optionally be used may be selected, for example, from among acrylic acid and alky-lacrylic acid esters, acrylonitriles, or mixtures thereof, such as, for example, methyl acrylate, ethyl acrylate, methyl methacrylate, ethyl methacrylate, acrylonitrile and mixtures thereof.

The diene elastomeric polymer may be selected, for example, from among: cis-1,4-polyisoprene (natural or syn-thetic, preferably natural rubber), 3,4-polyisoprene, polyb-utadiene (in particular polybutadiene with a high content of 1,4-cis), optionally halogenated isoprene/isobutene copoly-mers, 1,3-butadiene/acrylonitrile copolymers, styrene/1,3-butadiene copolymers, styrene/isoprene/1,3-butadiene copo-lymers, styrene/1,3-butadiene/acrylonitrile copolymers, and mixtures thereof.

The underlayer composition of the present tyre may possibly comprise at least one polymer of one or more monoolefins with an olefinic comonomer or derivatives thereof. The monoolefins may be selected for example from among ethylene and α-olefins generally containing from 3 to 12 carbon atoms, such as for example propylene, 1-butene, 1-pentene, 1-hexene, 1-octene or mixtures thereof. Among these copolymers, ethylene/propylene (EPR) or ethylene/propylene/diene (EPDM) copolymers are preferred.

The above-mentioned polymers may optionally be func-tionalised along the main chain or at the ends thereof.

The functional group may be introduced into the elasto-meric polymer by processes known in the art such as, for example, during the production of the elastomeric polymer by copolymerisation with at least one corresponding func-tionalised monomer containing at least one ethylene unsatu-ration; or by subsequent modification of the elastomeric polymer by grafting at least one functionalised monomer in the presence of a free radical initiator (for example, an organic peroxide).

Alternatively, the functionalisation may be introduced by reaction with suitable terminating agents or coupling agents.

In particular, the diene elastomeric polymers obtained by anionic polymerization in the presence of an organometallic initiator (in particular, an organolithium initiator) may be functionalised by reacting the residual organometallic groups derived from the initiator with suitable terminating agents or coupling agents such as, for example, amines, amides, imines, carbodiimides, alkyltin halides, substituted benzophenones, alkoxysilanes, aryloxy silanes, alkylthiols, alkyldithiolsilanes, carboxyalkylthiols, carboxyalkylthiolsi-lanes, and thioglycols.

Useful examples of terminating agents or coupling agents are known in the art and described, for example in patents EP2408626, EP2271682, EP3049447A1, EP2283046A1, EP2895515A1, EP451604, U.S. Pat. No. 4,742,124, WO2015086039A1 and WO2017211876A1.

Preferably, said at least one functionalised elastomeric polymer is obtained from polybutadiene (in particular polyb-utadiene with a high 1,4-cis content), styrene/1,3-butadiene copolymers, styrene/isoprene/1,3-butadiene copolymers, styrene/1,3-butadiene/acrylonitrile copolymers, and mix-tures thereof.

The underlayer composition of the present tyre may comprise two or more polymers as defined above, in admix-ture.

Preferably, the underlayer composition of the present tyre comprises polybutadiene in an amount lower than 50 phr, more preferably lower than 30 phr, even more preferably lower than 20 phr. Preferably, the underlayer composition of the present tyre does not comprise polybutadiene.

Preferably, the underlayer composition of the present tyre comprises:

from 70 to 100 phr of a synthetic or natural polyisoprene or mixtures thereof, 0 to 30 phr of a polybutadiene.

More preferably, the underlayer composition of the pres-ent tyre comprises:

80 to 100 phr of a synthetic or natural polyisoprene or mixtures thereof, 0 to 20 phr of a polybutadiene.

The term "polyisoprene" refers to isoprene polymers and copolymers.

The term "polybutadiene" refers to butadiene polymers and copolymers.

The composition of the at least one underlayer of the tyre according to the invention comprises one or more reinforc-ing fillers in a total amount preferably from 10 phr to 25 phr, more preferably from 15 to 25 phr or from 15 to 20 phr.

The underlayer composition of the tyre according to the invention comprises one or more reinforcing fillers in a total amount of less than 20%, preferably less than 18% by weight with respect to the total weight of the composition.

Preferably, the reinforcing filler is present in a total amount in the range from 5% to 20%, more preferably from 5% to 18% by weight with respect to the total weight of the composition.

The composition of the at least one underlayer of the tyre according to the invention comprises one or more reinforc-ing fillers, wherein said fillers comprise at least 5 phr of silicate fibres with needle-shaped morphology of nanometric dimensions.

Preferably, said reinforcing filler comprises at least 6 phr or at least 7 phr or at least 8 phr or at least 10 phr of silicate fibres with needle-shaped morphology of nanometric dimen-sions, possibly modified.

The reinforcing filler may comprise carbon black and white fillers, in particular silica, in addition to the silicate fibres with needle-shaped morphology of nanometric dimensions.

In one embodiment, said reinforcing filler, in addition to the silicate fibres with needle-shaped morphology of nanometric dimensions, comprises carbon black.

Preferably, the carbon black is selected from those having a surface area not smaller than 20 m²/g, preferably of about 40-50 m²/g (as determined by STSA-statistical thickness surface area according to ISO 18852:2005).

The carbon black may be, for example, N234, N326, N330, N375 or N550, N660 marketed by Birla Group (India) or by Cabot Corporation, preferably N550 or N660.

In one embodiment, said reinforcing filler, in addition to the silicate fibres with needle-shaped morphology of nanometric dimensions, may comprise a white filler selected from hydroxides, hydrated oxides and oxides, salts and hydrated salts of metals, silica, derivatives thereof and mixtures thereof.

In one embodiment, the reinforcing filler, in addition to the silicate fibres with needle-shaped morphology of nanometric dimensions, may comprise a mixture of at least one black filler and at least one other white filler.

In a preferred embodiment, said reinforcing filler, in addition to the silicate fibres with needle-shaped morphology of nanometric dimensions, may comprise silica, for example selected from pyrogenic silica, precipitated amorphous silica, wet silica (hydrated silicic acid), anhydrous silica (anhydrous silicic acid), or mixtures thereof. The silica that may be used in the present invention may have a BET surface area (measured according to ISO standard 5794/1) in the range from 10 m²/g to 300 m²/g, preferably from 30 m²/g to 250 m²/g, more preferably from 40 to 190 m²/g. Commercial examples of suitable silicas are Zeosil 1165 MP, Zeosil 1115 MP, Zeosil 185 GR, Efficium from Solvay, Newsil HD90 and Newsil HD200 from Wuxi, K160 and K195 from Wilmar, H160AT and H180 AT from IQE, Zeopol 8755 and 8745 from Huber, Perkasil TF100 from Grace, Hi-Sil EZ 120 G, EZ 160G, EZ 200G from PPG, Ultrasil 7000 GR and Ultrasil 9100 GR from Evonik. Another example of suitable silica is the rice husk silica described in WO2019229692A1.

In one embodiment, said reinforcing filler, in addition to the silicate fibres with needle-shaped morphology of nanometric dimensions, comprises silica in admixture with carbon black.

In one embodiment, said reinforcing filler, in addition to the silicate fibres with needle-shaped morphology of nanometric dimensions, comprises modified silica.

Silica may be modified for example by reaction with silsequioxanes (as in WO2018078480A1), by reaction with pyrroles (as in WO2016050887A1) or by reaction with silanising agents, such as bis(triethoxysilylpropyl)tetrasulphide (TESPT), 3-aminopropyltriethoxysilane (APTES) 3-glycidyloxypropyltriethoxysilane triethoxy (octyl) silane, triethoxy (ethyl) silane, triethoxy-3-(2-imidazolin-1-yl) propylsilane, triethoxy-p-tolylsilane, triethoxy (1-phenylethenyl) silane, triethoxy-2-thienylsilane, 1H,1H,2H,2H-perfluorooctyltriethoxysilane, 3-(triethoxysilyl) propyl isocyanate, 1H, 1H,2H,2H-perfluorodecylthriethoxysilane, isobutyltriethoxysilane, n-octadecyltriethoxysilane, (3-chloropropyl)triethoxysilane, triethoxysilane and 3-(triethoxysilyl) propionitrile. Commercial examples of suitable silanising agents are Si69, Dynasylan AMEO and Dynasylan GLYEO from Evonik.

The modified silica may be a sulphurised silanised silica.

Sulphurised silanised silica is a silica prepared by reaction of a silica, such as pyrogenic silica, precipitated amorphous silica, wet silica (hydrated silicic acid), anhydrous silica (anhydrous silicic acid), or mixtures thereof, or of a metal silicate, such as aluminium silicate, sodium silicate, potassium silicate, lithium silicate or mixtures thereof, with at least one sulphurised silanising agent.

The term "sulphur silanising agent" indicates an organic derivative of silicon containing mercapto, sulphide, disulphide or polysulphide groups, said derivative being able to react with the OH groups of silica.

A commercial example of suitable sulphurised silanised silica is Agilon 400 silica from PPG.

In one embodiment, said reinforcing filler, in addition to the silicate fibres with needle-shaped morphology of nanometric dimensions, comprises a modified silica in admixture with carbon black.

In one embodiment, said reinforcing filler, in addition to the silicate fibres with needle-shaped morphology of nanometric dimensions, comprises lamellar silicates, such as bentonites, alloysite, laponite, saponite, vermiculite or hydrotalcite. In one embodiment, said silicates are modified lamellar silicates analogously to what has already been described herein for modified silicate fibres with needle-shaped morphology of nanometric dimensions.

The present reinforcing filler comprises at least 5 phr of silicate fibres with needle-shaped morphology of nanometric dimensions.

Preferably, said fibres have a ratio between the largest dimension (length) and the diameter or the maximum cross-sectional dimension (average aspect ratio) of at least 2:1, preferably of at least 3:1, more preferably of at least 5:1 or at least 10:1. Preferably, the fibres have an average aspect ratio not greater than 1000:1, more preferably not greater than 100:1.

Preferably, said average aspect ratio is evaluated by microscopic observation, preferably performed on at least one hundred fibres. Preferably, at least 70%, 80%, 90% of the fibres have the above aspect ratio.

Preferably, said fibres have a diameter or a maximum cross-sectional dimension of between 1 and 100 nm, more preferably of between 5 and 50 nm, even more preferably of between 15 and 20 nm. Preferably, said fibres have a length of less than 10 microns, more preferably between 0.1 and 10 microns, even more preferably of between 0.1 and 5 microns.

Silicate fibres with needle-shaped morphology of nanometric dimensions are selected from the group consisting of magnesium and/or aluminium and/or calcium silicate fibres and mixtures thereof.

Preferably, the silicate fibres with needle-shaped morphology of nanometric dimensions are selected from sepiolite fibres, modified sepiolite fibres, paligorskite fibres (also known as attapulgite), wollastonite fibres, imogolite fibres and mixtures thereof, more preferably they are sepiolite fibres, modified sepiolite fibres or mixtures thereof.

Generally, sepiolite is needle-shaped and has average aspect ratios of from 3:1 to 1000:1, more commonly from 5:1 to 100:1.

Generally, wollastonite is needle-shaped and has average aspect ratios of from 3:1 to 20:1, more commonly from 10:1 to 20:1.

Generally, imogolite is needle-shaped and has average aspect ratios of from 5:1 to 100:1, more commonly from 5:1 to 50:1.

Examples of silicate fibres which can be used according to the present invention are the sepiolites marketed by Tolsa Group (http://www.tolsa.com/) under the name of Pangel S9 or Pansil 100.

In one embodiment, said silicate fibres with needle-shaped morphology of nanometric dimensions are modified fibres.

The silicate fibres with needle-shaped morphology of nanometric dimensions may be obtained from silicate fibres with needle-shaped morphology of nanometric dimensions selected from sepiolite fibres, paligorskite fibres (also known as attapulgite), wollastonite fibres, and mixtures thereof, more preferably modified sepiolite fibres or mixtures thereof.

In the present context, "modified silicate fibres with needle-shaped morphology of nanometric dimensions", in particular "modified sepiolite fibres" means for example the fibres modified by acid treatment with partial removal of magnesium up to a final content thereof comprised between 3.8% and 12%, which substantially retain the needle-like morphology and the original crystalline structure, described and exemplified in the patent application WO2016/174629A1 (in particular from page 9 to page 15 and from page 30 to page 36), on behalf of the Applicant, incorporated herein by reference.

These acid-modified fibres may be optionally further derivatised, for example by addition of at least one silanising agent to the acid treatment suspension of the fibres. Preferably, the silanising agent is selected from mono- or bifunctional silanes with one or two or three hydrolysable groups such as bis-(triethoxysilylpropyl) disulphide (TESPD), bis [3-(triethoxysilyl) propyl]tetrasulphide (TESPT), 3-thio-octanoyl-1-propyltriethoxysilane (NXT), $Me_2Si(OEt)_2$), $Me_2PhSiCl$, $Ph_2SiCl_2$ and the like, more preferably it is selected from TESPD and TESPT.

Other examples of suitable modified fibres are the silicate fibres with needle-shaped morphology of nanometric dimensions comprising amorphous silica deposited on the surface, described and exemplified in the patent application WO2016/174628A1 (in particular from page 7 to page 12 and from page 22 to page 23) in the name of the Applicant, incorporated herein by reference In one embodiment, the modified silicate fibres with needle-shaped morphology of nanometric dimensions may be fibres organically modified by reaction, for example, with quaternary ammonium salts such as sepiolite fibres modified by reaction with talloyl benzyl dimethyl ammonium chloride marketed by Tolsa under the name Pangel B5.

Preferably, said "silicate fibres with needle-shaped morphology of nanometric dimensions" are sepiolite or modified sepiolite fibres, for example but not only, for treatments with acids, described in the cited documents WO2016/174629A1 and IT102016000108318, by derivatisation with quaternary ammonium salts (for example Pangel B5 of Tolsa) or by deposition on the surface of nascent silica according to the process reported in the document WO2016/174628A1.

In one embodiment, the modified silicate fibres with needle-shaped morphology of nanometric dimensions may be fibres modified by reaction with a silanising agent selected for example from mono or bifunctional silanes with one or two or three hydrolysable groups such as bis-(3-triethoxysilyl-propyl)disulphide (TESPD), bis(3-triethoxysilyl-propyl)tetrasulphide (TESPT), 3-thio-octanoyl-1-propyl-triethoxysilane (NXT), $Me_2Si(OEt)_2$, $Me_2PhSiCl$, $Ph_2SiCl_2$ and the like.

In a preferred embodiment, said reinforcing filler comprises sepiolite.

In one embodiment, said reinforcing filler comprises silicate fibres with needle-shaped morphology of nanometric dimensions, preferably sepiolite, in admixture with carbon black.

In one embodiment, said reinforcing filler comprises modified silicate fibres with needle-shaped morphology of nanometric dimensions, preferably modified sepiolite, in admixture with carbon black.

In a preferred embodiment, the underlayer composition of the tyre according to the invention preferably comprises a reinforcing filler comprising a mixture of silica and silicate fibres with needle-shaped morphology of nanometric dimensions, optionally modified, more preferably a mixture of silica and sepiolite, possibly modified.

In a preferred embodiment, said reinforcing filler comprises a mixture of silica and silicate fibres with needle-shaped morphology of nanometric dimensions, preferably sepiolite possibly modified, in the form of microbeads prepared as described in WO2019106562A1.

In a preferred embodiment, said reinforcing filler comprises silica and silicate fibres with needle-shaped morphology of nanometric dimensions in a weight ratio thereof comprised between 0.5:1 and 5:1, preferably in a weight ratio comprised between 0.7:1 and 5:1, more preferably between 0.8:1 and 3:1, even more preferably between 0.9:1 and 1.1:1.

In one embodiment, said reinforcing filler comprises silica and sepiolite, possibly modified, in a weight ratio thereof between 0.5:1 and 5:1, preferably between 0.7:1 and 5:1, more preferably between 0.8:1 and 3:1, even more preferably between 0.9:1 and 1.1:1.

In one embodiment, said reinforcing filler consists of silica and silicate fibres with needle-shaped morphology of nanometric dimensions, possibly modified, in a weight ratio thereof comprised between 0.5:1 and 5:1, preferably comprised between 0.7:1 and 5:1, more preferably between 0.8:1 and 3:1, even more preferably between 0.9:1 and 1.1:1.

In one embodiment, said reinforcing filler consists of silica and sepiolite, possibly modified, in a weight ratio thereof between 0.5:1 and 5:1, preferably between 0.7:1 and 5:1, more preferably between 0.8:1 and 3:1, even more preferably between 0.9:1 and 1.1:1.

Particularly preferred are the reinforcing filler M2 prepared according to Example 1, the reinforcing filler M4A prepared according to Example 2, and the reinforcing filler M6 prepared according to Example 3 of the patent application WO2019106562A1 in the name of the Applicant comprising silica and modified sepiolite fibres. These white fillers will hereafter be referred to as: SilSep1 (reinforcing filler M2 prepared according to Example 1 of patent application WO2019/106562A1, comprising organically modified sepiolite fibres, i.e. Pangel B5 from Tolsa and silica in a weight ratio of 1:1;). SilSep2 (reinforcing filler M6 prepared according to Example 3 of patent application WO2019/106562A1, comprising organically and acid-modified sepiolite fibres and silica in a weight ratio of 1:1) and SilSep3 (reinforcing filler M4A prepared according to Example 2 of patent application WO2019/106562A1, comprising acid-modified sepiolite fibres and silica in a weight ratio of 1:1).

In a preferred embodiment, said reinforcing filler comprises carbon black, silica and silicate fibres with needle-shaped morphology of nanometric dimensions, possibly modified.

In one embodiment, said reinforcing filler comprises from 0 to 15 phr of carbon black, from 5 to 20 phr of silica and from 5 to 20 phr of silicate fibres with needle-shaped morphology of nanometric dimensions, possibly modified.

In a preferred embodiment, said reinforcing filler consists of 0 to 15 phr of carbon black, 5 to 20 phr of silica and 5 to 20 phr of silicate fibres with needle-shaped morphology of nanometric dimensions, possibly modified.

In a preferred embodiment, said reinforcing filler consists of 0 to 15 phr of carbon black, 5 to 10 phr of silica and 5 to 10 phr of silicate fibres with needle-shaped morphology of nanometric dimensions, possibly modified.

In one embodiment, said reinforcing filler consists of silica and silicate fibres with needle-shaped morphology of nanometric dimensions, possibly modified.

In one embodiment, said reinforcing filler consists of silicate fibres with needle-shaped morphology of nanometric dimensions, possibly modified.

In a more preferred embodiment, said reinforcing filler comprises carbon black from 0 to 15 phr, silica from 5 to 15 phr and silicate fibres with needle-shaped morphology of nanometric dimensions, possibly modified, from 5 to 15 phr, said filler being in total amount not higher than 25 phr and preferably not less than 15 phr.

Preferably, the silicate fibres with needle-shaped morphology of nanometric dimensions used in the present composition for underlayer of the present tyre are sepiolite fibres, optionally modified as described above.

In a preferred embodiment, said reinforcing filler comprises carbon black, silica and sepiolite fibres.

In a more preferred embodiment, said reinforcing filler comprises carbon black from 0 to 15 phr, silica from 5 to 15 phr and sepiolite fibres from 5 to 15 phr, overall said reinforcing filler being in an amount not higher than 25 phr, preferably not higher than 23 phr, even more preferably not higher than 20 phr.

In an even more preferred embodiment, said reinforcing filler comprises from 0 to 15 phr of carbon black and from 10 to 22 phr of SilSep1 and/or SilSep2 and/or SilSep3.

The underlayer composition of the present tyre according to the invention may comprise from 0.1 to 10 phr of a vulcanisation agent.

Preferably, the composition comprises at least 0.2 phr, 0.5 phr, 0.8 phr or 1 phr of at least one vulcanisation agent. Preferably, the composition comprises from 0.1 to 10 phr, from 0.2 to 10 phr, from 1 to 10 phr or from 1.5 to 5 phr of at least one vulcanisation agent.

The at least one vulcanisation agent is preferably selected from sulphur, or alternatively, sulphurised agents (sulphur donors), such as, for example, bis [(trialkoxysilyl) propyl] polysulphides, thiurams, dithiodimorpholines and caprolactam-disulphide and mixtures thereof. Alternatively, the vulcanisation agent is a peroxide which contains an O—O bond and may generate reactive radicals by heating.

Preferably, the vulcanisation agent is sulphur, preferably selected from soluble sulphur (crystalline sulphur), insoluble sulphur (polymeric sulphur), and oil-dispersed sulphur and mixtures thereof.

Commercial examples of vulcanisation agents suitable for use in the underlayer composition of the present tyre of the invention are Redball Superfine sulphur from International Sulfur Inc., Crystex™ OT 33 AS sulphur and Eastmann Crystex™ HS OT 20 sulphur. In the present underlayer composition of the present tyre, the vulcanisation agent may be used together with adjuvants such as vulcanisation activating agents, accelerants and/or retardants known to those skilled in the art.

The underlayer composition of the present tyre may optionally comprise at least one vulcanisation activating agent.

The vulcanisation activating agents suitable for use in the present underlayer composition of the present tyre are zinc compounds, in particular ZnO, $ZnCO_3$, zinc salts of saturated or unsaturated fatty acids containing from 8 to 18 carbon atoms, preferably formed in situ in the underlayer composition of the present tyre by reaction of ZnO and of the fatty acid or mixtures thereof. Preferably, zinc stearate, preferably formed in situ from ZnO and fatty acid, or magnesium stearate, formed from MgO, or mixtures thereof, is used in the underlayer composition of the present tyre.

The vulcanisation activating agents may be present in the underlayer composition of the present tyre of the invention in amounts preferably from 0.2 phr to 15 phr, more preferably from 1 phr to 5 phr.

More preferred activating agents derive from the reaction of zinc oxide and stearic acid. An example of activating agent is the product Aktiplast ST marketed by Rheinchemie.

The underlayer composition of the present tyre may further comprise at least one vulcanisation accelerant.

Vulcanisation accelerants that are commonly used may be for example selected from dithiocarbamates, guanidines, thioureas, thiazoles, sulphenamides, sulphenimides, thiurams, amines, xanthates, or mixtures thereof.

Preferably, the accelerant agent is selected from mercaptobenzothiazole (MBT), N-cyclohexyl-2-benzothiazol-sulphenamide (CBS), N-tert-butyl-2-benzothiazol-sulphenamide (TBBS) and mixtures thereof.

Commercial examples of accelerants suitable for use in the present underlayer composition of the present tyre are N-cyclohexyl-2-benzothiazyl-sulphenamide Vulkacit® (CBS or CZ), and N-terbutyl 2-benzothiazil sulphenamide, Vulkacit® NZ/EGC marketed by Lanxess.

Vulcanisation accelerants may be used in the present underlayer composition of the present tyre in an amount preferably of from 0.05 phr to 10 phr, preferably from 0.1 phr to 7 phr, more preferably from 0.5 phr to 5 phr.

The underlayer composition of the present tyre may optionally comprise at least one vulcanisation retardant agent.

The vulcanisation retardant agent suitable for use in the present underlayer composition of the present tyre is preferably selected from urea, phthalic anhydride, N-nitrosodiphenylamine N-cyclohexylthiophthalimide (CTP or PVI) and mixtures thereof.

A commercial example of a suitable retardant agent is N-cyclohexylthiophthalimide VULKALENT G of Lanxess.

The vulcanisation retardant agent may be present in the present underlayer composition of the present tyre in an amount preferably of from 0.05 phr to 2 phr. The present underlayer composition of the present tyre may comprise one or more vulcanisation retardants as defined above in admixture.

Depending on the underlayer composition of the present tyre, the man skilled in the art can adapt the composition of the vulcanisation package and the cross-linking conditions in order to impart a cross-linking degree to the vulcanised elastomeric compound commensurate with the non-exceeding of the shear modulus value G' set according to the present invention.

The underlayer composition of the present tyre may further comprise at least 0.05 phr, preferably at least 0.1 phr or 0.5 phr or 0.7 phr, more preferably at least 1 phr or 2 phr of at least one silane coupling agent capable of interacting with the silica-based reinforcing fillers and to bind them to elastomeric polymers during vulcanisation.

Preferably, the silane coupling agent is present in an amount of at least 7% by weight, more preferably at least 9% by weight with respect to the weight of white filler. Preferably, the underlayer composition of the present tyre comprises from 0.1 phr to 20.0 phr or from 0.5 phr to 10.0 phr, even more preferably from 1.0 phr to 5.0 phr of at least one silane coupling agent.

Preferably, said coupling agent is a silane coupling agent selected from those having at least one hydrolysable silane group which may be identified, for example, by the following general formula (III):

$$(R')_3Si—C_nH_{2n}—X \qquad (III)$$

wherein the groups R', equal or different from each other, are selected from: alkyl, alkoxy or aryloxy groups or from halogen atoms, provided that at least one of the groups R' is an alkoxy or an aryloxy group; n is an integer of from 1 to 6; X is a group selected from: nitrose, mercapto, amino, epoxide, vinyl, imide, chloro, $—(S)_mC_nH_{2n}—Si—(R')_3$ and $—S—COR'$, wherein m and n are integers of from 1 to 6 and the groups R' are as defined above.

Particularly preferred silane coupling agents are bis(3-triethoxysilylpropyl)tetrasulphide, 3-thio-octanoyl-1-propyl-triethoxysilane (NXT) and bis(3-triethoxysilyl-propyl) disulphide. Said coupling agents may be added as such or in mixture with an inert filler (such as carbon black) so as to facilitate their incorporation into the underlayer composition of the present tyre.

An example of the silane coupling agent is TESPT: bis(3-triethoxysilylpropyl)tetrasulphide Si69 marketed by Evonik.

The underlayer composition of the present tyre may further comprise one or more additional ingredients, commonly used in the field, such as for example plasticising oils, resins, antioxidant and/or antiozonating agents (anti-aging agents), waxes, adhesives and the like.

For example, the underlayer composition of the present tyre according to the invention, in order to further improve the workability of the compound, may comprise at least one plasticising oil.

The amount of plasticiser is preferably in the range from 0.5 to 10 phr, preferably from 1 to 7 phr.

The term "plasticising oil" means a process oil derived from petroleum or a mineral oil or a vegetable oil or a synthetic oil or combinations thereof.

The plasticising oil may be a process oil derived from petroleum selected from paraffins (saturated hydrocarbons), naphthenes, aromatic polycyclic and mixtures thereof.

Examples of suitable process oils derived from petroleum are aromatic, paraffinic, naphthenic oils such as MES (Mild Extract Solvated), DAE (Distillate Aromatic Extract), TDAE (Treated Distillate Aromatic Extract), TRAE (Treated Residual Aromatic Extract). RAE (Residual Aromatic Extract) known in the industry.

The plasticising oil may be an oil of natural or synthetic origin derived from the esterification of glycerol with fatty acids, comprising glycerine triglycerides, diglycerides, monoglycerides or mixtures thereof.

Examples of suitable vegetable oils are sunflower, soybean, linseed, rapeseed, castor and cotton oil.

The plasticising oil may be a synthetic oil selected from among the alkyl or aryl esters of phthalic acid or phosphoric acid.

The underlayer composition of the present tyre according to the invention may further comprise at least one resin.

The resin is a non-reactive resin, preferably selected from among hydrocarbon resins, phenolic resins, natural resins and mixtures thereof.

The amount of resin is preferably in the range from 0.5 to 10 phr, more preferably from 1 to 5 phr.

The underlayer composition of the present tyre may optionally comprise at least one wax.

The wax may be for example a petroleum wax or a mixture of paraffins.

Commercial examples of suitable waxes are the Repsol N-paraffin mixture and the Antilux® 654 microcrystalline wax from Rhein Chemie.

The wax may be present in the underlayer composition of the present tyre of the invention in an overall amount generally from 0.1 phr to 5 phr, preferably from 0.5 phr to 3 phr.

The underlayer composition of the present tyre may optionally comprise at least one antioxidant agent.

The antioxidant agent is preferably selected from N-isopropyl-N'-phenyl-p-phenylenediamine (IPPD), N-(-1,3-dimethyl-butyl)-n'-phenyl-p-phenylenediamine (6PPD), N,N'-bis-(1,4-dimethyl-pentyl)-p-phenylenediamine (77PD), N,N'-bis-(1-ethyl-3-methyl-pentyl)-p-phenylenediamine (DOPD), N,N'-bis-(1,4-dimethyl-pentyl)-p-phenylenediamine, N,N'-diphenyl-p-phenylenediamine (DPPD), N,N'-ditolyl-p-phenylenediamine (DTPD), N,N'-di-beta-naphthyl-p-phenylenediamine (DNPD), N,N'-bis(1-methylheptyl)-p-phenylenediamine, N,N'-Di-sec-butyl-p-phenylenediamine (44PD), N-phenyl-N-cyclohexyl-p-phenylenediamine, N-phenyl-N'-1-methylheptyl-p-phenylenediamine and the like and mixtures thereof, preferably it is N-1,3-dimethylbutyl-N-phenyl-p-phenylene-diamine (6-PPD).

A commercial example of a suitable antioxidant agent is Santoflex™ 6PPD from Eastman.

The antioxidant agent may be present in the underlayer composition of the present tyre in an overall amount preferably from 0.1 phr to 6 phr, more preferably from 0.5 phr to 4 phr.

The present elastomeric compound may be prepared according to a process which typically comprises one or more mixing steps in at least one suitable mixer, in particular at least one mixing step (i) (non-productive) and a mixing step (ii) (productive) as defined above.

Each mixing step may comprise several intermediate processing steps or sub-steps, characterised by the momentary interruption of the mixing to allow the addition of one or more ingredients but generally without intermediate discharge of the compound.

The mixing may be carried out, for example, using an open mixer of the "open-mill" type or an internal mixer of the type with tangential rotors (Banbury®) or with interpenetrating rotors (Intermix), or in continuous mixers of the Ko-Kneader™ type (Buss®) or of the twin-screw or multiscrew type.

Typically, after one or more thermo-mechanical treatment steps, the vulcanisation agent is incorporated into the materials, preferably together with vulcanisation accelerants and/or retardants, in the final treatment step, production step (ii), where the temperature is generally kept below 120° C. and preferably below 100° C., in order to prevent any undesired pre-vulcanisation phenomenon. Subsequently, the vulcanisable compound thus obtained can be subsequently calendared, for example in the form of a sheet or extruded, for example to form a profiled rubber element such as the underlayer, which is incorporated into the tyre and subjected to vulcanisation, according to known techniques.

The tyre of the invention is suitable for four-wheeled vehicles for road use, as tyres adapted to equip medium and high powered cars for transporting people (maximum chord size from 195 mm to 245 mm).

The tyre according to the invention is particularly suitable for electric vehicles.

The Applicant believes that the invention is also adapted for tyres for small cars or high-performance tyres (HP high performance-UHP ultra high performance) with maximum chord size, for example, from 145 mm to 355 mm.

These tyres are preferably mounted on rims having rim diameters equal to or larger than 13 inches, preferably not larger than 24 inches, more preferably of between 16 inches and 23 inches.

In general, the tyre according to the invention can be a tyre for passenger cars, including both automobile tyres, such as for example the high-performance tyres defined below, and tyres for light transport vehicles, for example vans, campers, pick-up, typically with total mass at full load equal to or less than 3500 kg. The tyres of the invention can also be used in vehicles other than the aforementioned cars, for example in high-performance road and sports motorcycles, i.e. motorcycles capable of reaching speeds even higher than 270 km/h. Such motorcycles are those that belong to the category typically identified with the following classifications: hypersport, supersport, sport touring, and for lower speed ratings: scooter, street enduro and custom.

The term "tyre for motorcycle wheels" means a tyre having a high curvature ratio (typically greater than 0.200), capable of reaching high angles of inclination (roll angles) of the plane of symmetry of the motorcycle with respect to the vertical plane, during cornering of the motorcycle.

The tyre may be an HP (High Performance) or UHP (Ultra High Performance) tyre intended for equipping vehicles for the transport mainly of people, such as Sedan, Minivan, family, SUVs (Sport Utility Vehicles) and/or CUVs (Crossover Utility Vehicles), typically tyres that allow driving at high speeds.

The high and ultra-high performance tyres are in particular those which allow to reach speeds higher than at least 160 km/h, higher than 200 km/h up to over 300 km/h. Examples of such tyres are those belonging to the classes "T", "U", "H", "V", "Z", "W", "Y" according to the E.T.R.T.O.— (European Tyre and Rim Technical Organisation) standards, in particular for four-wheel high-power vehicles. Typically, the tyres belonging to these classes have a section width equal to 185 mm or greater, preferably not greater than 325 mm, more preferably of between 195 mm and 325 mm. These tyres are preferably mounted on rims having rim diameters equal to or larger than 15 inches, preferably not larger than 24 inches, more preferably of between 17 inches and 22 inches. By SUV and CUV it is meant vehicles with raised distribution, typically four-wheel drive, typically having a displacement greater than or equal to 1800 cc, more preferably of between 2000 cc and 6200 cc. Preferably, these vehicles have a mass greater than 1,400 kg, more preferably of between 1500 Kg and 3000 Kg.

The tyre of the invention may be used as a summer or winter or "all-season" (tyre usable in all seasons) tyre.

Description of a Tyre According to the Invention

Further features and advantages of the tyre according to the invention will become apparent from the following description of a preferred embodiment thereof, given below by way of non-limiting example, to be read with reference to the attached FIG. 1, which is not to scale.

A tyre for vehicle wheels according to the invention, comprising at least one component comprising the present elastomeric compound, is illustrated in radial half-section in FIG. 1.

In FIG. 1, "a" indicates an axial direction and "X" indicates a radial direction, in particular X-X indicates the outline of the equatorial plane. For simplicity, FIG. 1 shows only a portion of the tyre, the remaining portion not shown being identical and arranged symmetrically with respect to the equatorial plane "X-X".

The tyre (100) for four-wheeled vehicles comprises at least one carcass structure, comprising at least one carcass layer (101) having respectively opposite end flaps engaged with respective annular anchoring structures (102), referred to as bead cores, possibly associated to a bead filler (104).

The tyre area comprising the bead core (102) and the filler (104) forms a bead structure (103) intended for anchoring the tyre onto a corresponding mounting rim, not shown.

The carcass structure is usually of radial type. i.e. the reinforcing elements of the at least one carcass layer (101) lie on planes comprising the rotational axis of the tyre and substantially perpendicular to the equatorial plane of the tyre. Said reinforcing elements generally consist of textile cords, such as rayon, nylon, polyester (for example polyethylene naphthalate, PEN). Each bead structure is associated to the carcass structure by folding back of the opposite lateral edges of the at least one carcass layer (101) around the annular anchoring structure (102) so as to form the so-called carcass flaps (101a) as shown in FIG. 1.

In one embodiment, the coupling between the carcass structure and the bead structure can be provided by a second carcass layer, not shown in FIG. 1, applied in an axially external position with respect to the first carcass layer.

An anti-abrasive strip (105) possibly made with elastomeric material is arranged in an external position of each bead structure (103).

The carcass structure is associated to a belt structure (106) comprising one or more belt layers (106a), (106b) placed in radial superposition with respect to one another and with respect to the carcass layer, having typically textile and/or metallic reinforcing cords incorporated within a layer of elastomeric material.

Such reinforcing cords may have crossed orientation with respect to a direction of circumferential development of the tyre (100). By "circumferential" direction it is meant a direction generally facing in the direction of rotation of the tyre.

In a radially outermost position to the belt layers (106a), (106b) at least one zero-degree reinforcing layer (106c), commonly known as a "0° belt", may be applied, which generally incorporates a plurality of elongated reinforcing elements, typically metallic or textile cords, oriented in a substantially circumferential direction, thus forming an angle of a few degrees (such as an angle of between about 0° and) 6° with respect to a direction parallel to the equatorial plane of the tyre, and coated with an elastomeric material.

A tread band (cap) (109) comprising the elastomeric compound according to the invention is applied in a position radially external to the belt structure (106).

Moreover, respective sidewalls (108) of elastomeric material are applied in an axially external position on the lateral surfaces of the carcass structure, each extending from one of the lateral edges of tread (109) at the respective bead structure (103).

In a radially external position, the tread band (109) has a rolling surface (109a) intended to come in contact with the ground. Circumferential grooves, which are connected by transverse notches (not shown in FIG. 1) so as to define a plurality of blocks of various shapes and sizes distributed over the rolling surface (109a), are generally made on this surface (109a), which for simplicity is represented smooth in FIG. 1.

An underlayer (base) (111) in elastomeric material characterised by a shear modulus value G' measured at 70° C., 10 Hz, 9% strain according to the RPA method disclosed in the present description of less than 0.90 MPa, a dynamic elastic compression modulus value E' comprised between 3.00 and 8.00 MPa and a dynamic viscous compression modulus value E" of less than 0.24 MPa, said moduli E' and E" being measured as described in the present experimental part, is arranged between the belt structure (106) and the tread band (109).

As shown in FIG. 1, the underlayer (111) may have a uniform thickness.

Alternatively, the underlayer (111) may have a variable thickness in the axial direction. For example, the underlayer may have a greater thickness close to its axially external edges with respect to the central (crown) zone.

In FIG. 1, said underlayer (111) extends on a surface substantially corresponding to the extension surface of said belt structure (106). In one embodiment, said underlayer (111) extends only over a portion of the extension of said belt structure (106), for example on opposite side portions of said belt structure (106) (not shown in FIG. 1).

In one embodiment, said underlayer has a thickness which varies in the axial direction so as to be thicker at the blocks defined in the tread band.

According to one embodiment, said underlayer is formed by a plurality of spirals of an elongated continuous element.

A strip consisting of elastomeric material (110), commonly known as "mini-sidewall", may optionally be provided in the connecting zone between the sidewalls (108) and the tread band (109), this mini-sidewall being generally obtained by co-extrusion with the tread band (109) and allowing an improvement of the mechanical interaction between the tread band (109) and the sidewalls (108). Preferably, the end portion of the sidewall (108) directly covers the lateral edge of the tread band (109).

In the case of tubeless tyres, a rubber layer (112), generally known as "liner", which provides the necessary impermeability to the inflation air of the tyre, can also be provided in a radially internal position with respect to the carcass layer (101).

The rigidity of the tyre sidewall (108) may be improved by providing the bead structure (103) with a reinforcing layer (120) generally known as "flipper" or additional strip-like insert.

The flipper (120) is a reinforcing layer which is wound around the respective bead core (102) and the bead filler (104) so as to at least partially surround them, said reinforcing layer being arranged between the at least one carcass layer (101) and the bead structure (103). Usually, the flipper is in contact with said at least one carcass layer (101) and said bead structure (103). The flipper (120) typically comprises a plurality of textile cords incorporated within a layer of elastomeric material.

The reinforcing annular structure or bead (103) of the tyre may comprise a further protective layer which is generally known by the term of "chafer" (121) or protective strip and which has the function of increasing the rigidity and integrity of the bead structure (103).

The chafer (121) usually comprises a plurality of cords incorporated within a rubber layer of elastomeric material.

Such cords are generally made of textile materials (such as aramide or rayon) or metal materials (such as steel cords).

A layer or sheet of elastomeric material may be arranged between the belt structure and the carcass structure. The layer may have a uniform thickness. Alternatively, the layer may have a variable thickness in the axial direction. For example, the layer may have a greater thickness close to its axially external edges with respect to the central (crown) zone. Advantageously, the layer or sheet may extend on a surface substantially corresponding to the extension surface of said belt structure.

According to an embodiment not shown, the tyre may be a tyre for motorcycle wheels which is typically a tyre that has a straight section featuring a high tread camber.

According to an embodiment not shown, the tyre may be a tyre for bicycle wheels. The building of the tyre (100) as described herein, may be carried out by assembling respective semi-finished products adapted to form the components of the tyre, on a forming drum, not shown, by at least one assembling device.

At least a part of the components intended to form the carcass structure of the tyre may be built and/or assembled on the forming drum. More particularly, the forming drum is intended to first receive the possible liner, and then the carcass structure. Thereafter, devices non shown coaxially engage one of the annular anchoring structures around each of the end flaps, position an outer sleeve comprising the belt structure, the underlayer and the tread band in a coaxially centred position around the cylindrical carcass sleeve and shape the carcass sleeve according to a toroidal configuration through a radial expansion of the carcass structure, so as to cause the application thereof against a radially internal surface of the outer sleeve.

After building of green tyre, a moulding and vulcanisation treatment is generally carried out in order to determine the structural stabilisation of the tyre through cross-linking of the elastomeric compositions, as well as to impart a desired tread pattern on the tread band and to impart any distinguishing graphic signs at sidewalls.

The following examples are now provided for merely illustrative and non-limiting purposes.

Experimental Part

Evaluation Methods

The static mechanical properties (CA1 load at 100% elongation, CR tensile strength, AR % elongation at break) according to the UNI 6065:2001 standard were measured at 23° C. on samples of elastomeric materials, vulcanised at 170° C. for 10 minutes.

The compressive dynamic mechanical properties E', E" and Tan delta were measured using an Instron model 1341 dynamic device in the tension-compression mode as described herein. A test piece of cross-linked material (170° C. for 10 minutes) having a cylindrical shape (length=25 mm; diameter=14 mm), preloaded in compression up to a longitudinal strain of 25% with respect to the initial length and maintained at the predetermined temperature of 23° C. for the whole duration of the test was subjected to a dynamic sinusoidal strain having an amplitude of ±3.5% with respect to the length under pre-load, with a frequency of 10 Hz. The dynamic mechanical properties are expressed in terms of dynamic elastic modulus (E'), dynamic viscous modulus (E") and Tan delta (loss factor). The Tan delta value was calculated as the ratio between the viscous dynamic module (E") and the dynamic elastic modulus (E').

The dynamic shear mechanical properties of dynamic modulus G' and Tan delta were evaluated using an Alpha Technologies RPA oscillating chamber rheometer (Rubber Process Analyser) with chamber geometry as described in ASTM D6601-19 FIG. 1, applying the following method:

1) an approximately cylindrical test sample with a volume in the range from 4.6 to 5 $cm^3$ was obtained by punching a sheet with a thickness of at least 5 mm of the green composition to be characterised;

2) the chambers of the RPA apparatus were preliminarily preheated to 170° C.;

3) the sample was loaded between the chambers of the RPA apparatus and the chambers were closed. Between the sample of the green composition and each chamber of the RPA apparatus, two films were interposed to protect the chamber itself: in contact with the compound, a film of Nylon 6.6 cast of about 25 microns and in contact with the chamber of the RPA apparatus a polyester film of about 23 microns;

4) the sample was then vulcanised for a fixed time of 10 min at a temperature of 170° C. while recording the vulcanisation curve, i.e. subjecting the sample to a sinusoidal deformation of 7% amplitude and 1.67 Hz frequency for the entire duration of the vulcanisation;

5) the temperature of the chambers of the RPA apparatus was then brought to 70° C.; 10 minutes after the chamber temperature was set at 70° C., a sequence of dynamic measurements was performed at a constant temperature of 70° C. by sinusoidally stressing the sample in torsion at a fixed frequency of 10 Hz and amplitude progressively increasing from 0.3% to 10%, carrying out 10 stabilisation cycles and 10 measurement cycles for each condition;

6) again at 70° C., a dynamic measurement was then performed by sinusoidally stressing the sample in torsion at the fixed frequency of 10 Hz and amplitude of 9%, carrying out 10 stabilisation cycles and 20 measurement cycles: the result was expressed as average of what measured in the 20 measurement cycles, as dynamic shear modulus G' and as Tan Delta (ratio between viscous modulus G" and elastic modulus G', Tan Delta=G"/G').

Rolling Resistance (RR) Assessment

Rolling resistance (RR) measurements were carried out on the sample tyres thus produced according to the UNECE reg. 117 Rev.4 annex 6-ISO 28580:2018 (par. 4b (torque method)—Notification No. 2011-237 (Korea). The rolling resistance coefficient was expressed in N/kN.

The tyres thus tested were then assigned a relative rolling resistance index equal to the ratio of the rolling resistance measured for the tyre in question with respect to the reference tyre. The lower the value of this index, the lower the rolling resistance of the tyre under test and therefore the better its performance.

Example 1: Preparation of Elastomeric Compounds for Underlayer

The reference compositions and the compositions according to the tyre of the invention reported in the following Table 1 were prepared as elastomeric compositions for the underlayer of the tyre:

TABLE 1

| elastomeric compositions (phr) | | | | | | | |
|---|---|---|---|---|---|---|---|
| Compositions | Ref. 1 | Ref. 2 | Ref. 3 | Inv. 1 | Inv. 2 | Inv. 3 | Inv. 4 |
| NR | 80 | — | 60 | — | — | 80 | 100 |
| IR | 20 | 100 | 20 | 100 | 100 | 20 | — |
| BR | — | — | 20 | — | — | — | — |
| N-550 | — | 36.0 | — | — | — | — | 13.0 |
| Silica | 36.0 | | 18.0 | — | — | — | — |
| SilSep2 | — | — | 15.0 | 20 | 20 | — | — |
| SilSep1 | — | — | — | — | — | 16.0 | 12.0 |
| Total Phr reinforcing filler | 36 | 36 | 33 | 20 | 20 | 16 | 25 |
| Phr silicate fibres | 0 | 0 | 7.5 | 10 | 10 | 8 | 6 |
| Stearic acid | 2.0 | 2.0 | 2.0 | 2.0 | 2.0 | 2.0 | 2.0 |
| Zinc oxide | 4.0 | 4.0 | 4.0 | 4.0 | 4.0 | 4.0 | 4.0 |
| TESPT 50% on CB | 7.0 | 7.0 | 7.0 | 7.0 | 7.0 | 4.0 | 2.0 |
| TMQ | 1.0 | 1.0 | 1.0 | 1.0 | 1.0 | 1.0 | 1.0 |
| 6-PPD | 2.0 | 2.0 | 2.0 | 2.0 | 2.0 | 2.0 | 2.0 |
| TBBS | 1.9 | 1.9 | 1.9 | 1.9 | 1.9 | 1.9 | 1.9 |
| Isobutyl TUADS | — | — | — | — | 0.3 | 0.3 | 0.3 |
| Sulphur | 3.6 | 3.6 | 3.6 | 3.6 | 3.6 | 3.6 | 3.6 |
| Total Phr | 157.5 | 157.5 | 154.5 | 141.5 | 141.8 | 134.8 | 141.8 |
| Total filler (% by weight) | 25 | 25 | 24 | 17 | 17 | 13 | 17.6 | wherein Ref.=reference, Inv.=Invention, Ref. 1 is an underlayer composition commonly applied by the Applicant to tyres of class B and A of RR; IR: synthetic polyisoprene (SKI-3 Nizhnekamskneftekhim); NR: natural rubber (Standard Thai Rubber STR 20-Thaiteck Rubber); BR: polybutadiene (Europrene Neocis®-Polymers Europe); N550: carbon black (N550 Birla Carbon); Silica: ZEOSIL 1115 HP (Solvay); SilSep1: white filler in microbeads M2 prepared according to Example 1 of patent application WO2019106562A1, comprising organically modified sepiolite fibres (Pangel B5 from Tolsa) and silica in a weight ratio of 1:1; SilSep2: white filler in microbeads M6 prepared according to Example 3 of patent application WO2019106562A1, comprising sepiolite fibres, organically and acid-modified (Pangel B5 from Tolsa), and silica in a weight ratio of 1:1; Stearic acid:STEARINA N (SOGIS); Zinc oxide:Rhenogran® ZnO-80 (RheinChemie); TESPT 50% on CB: Mixture of Bis(triethoxysilylpropyl)tetrasulphide (TESPT 50%) supported on carbon black (50%), produced by Evonik Industries AG, Germany; TMQ (antiageing): polymerised NAUGARD Q (CHEMTURA CORPORATION); 6-PPD (antioxidant): N-(1,3-dimethylbutyl)-N'-phenyl-p-phenylene-diamine (Santoflex™ 6PPD-Eastman); TBBS (accelerant): N-tert-butyl-2-benzothiazylsulphenamide (Vulkacit® NZ/EGC-Lanxess); Isobutyl TUADS (Isobutylthiuram disulphide) accelerant produced by RTVanderbilt; Sulphur (vulcaniser): insoluble 67%, Solfotecnica. Starting from the elastomeric compositions shown in Table 1, the corresponding elastomeric compounds were prepared according to the following process.

The mixing of the components was carried out in two steps using an internal mixer (Banbury, Intermix or Brabender)

In the first step (1), all the ingredients were introduced with the exception of vulcanisers and accelerants. The mixing was continued for a maximum time of 5 minutes, reaching a temperature of approximately 145° C. Subsequently, in the second test (2), again carried out using an internal mixer, the vulcanisers and accelerants were added, and the mixing was continued for about 4 minutes while maintaining the temperature below 100° C. The compounds were then unloaded. After cooling and at least 12 hours from preparation, some samples of the compounds were vulcanised in a press at 170° C. for 10 min to give the specimens useful for mechanical characterisations.

Characterisation of the Compounds

The main static and dynamic properties of the aforementioned elastomeric compounds, measured by the methods described above, are shown in the following Table 2:

TABLE 2

| static and dynamic properties | | | | | | | |
|---|---|---|---|---|---|---|---|
| Property | Ref. 1 | Ref. 2 | Ref. 3 | Inv. 1 | Inv. 2 | Inv. 3 | Inv. 4 |
| CA1 (MPa) | 2.03 | 2.33 | 2.54 | 3.16 | 4.89 | 3.39 | 3.13 |
| CR (MPa) | 20.1 | 19.4 | 17.3 | 19.8 | 12.9 | 8.3 | 9.7 |
| AR % | 488 | 426 | 476 | 488 | 260 | 275 | 272 |
| E' 23° C. 10 Hz (MPa) | 4.21 | 4.03 | 4.93 | 3.97 | 4.86 | 4.68 | 5.19 |
| E" 23° C. 10 Hz (MPa) | 0.25 | 0.29 | 0.37 | 0.21 | 0.20 | 0.17 | 0.19 |
| Tan D 23° C. 10 Hz | 0.060 | 0.071 | 0.074 | 0.052 | 0.042 | 0.036 | 0.036 |
| G'70° C. 10 Hz (MPa, RPA) | 0.98 | 1.08 | 1.01 | 0.73 | 0.85 | 0.74 | 0.82 |
| Tan D 70° C. 10 Hz (RPA) | 0.065 | 0.071 | 0.070 | 0.053 | 0.045 | 0.049 | 0.050 |

As appears from the values reported in Table 2, the compositions of the tyre according to the invention (Inv. 1-Inv. 4), characterised by a contained total amount of reinforcing filler and by the presence of at least 5 phr of silicate fibres, showed values of G' and E" significantly lower than the references while they maintained high E' values, comparable to those of the reference compounds.

The compositions according to the invention showed significantly decreased Tan D values, predictive of reduced rolling resistance in the tyre.

However, the high values of E' shown by the compounds, indicative of a considerable elasticity and stiffness of the materials, could anticipate possible problems of handling and comfort in the tyre, problems surprisingly not encountered as evidenced by the results of the driving tests.

It should be noted that the reference composition 3, although comprising silicate fibres, did not have G', E" and Tan delta values of interest, having an excessive overall amount of reinforcing filler. This composition basically followed the teaching of the prior document EP2714426A1.

Example 2: Tyre Performance in Road Driving Tests

The performance of the tyre according to the invention was tested on the road. Summer tyres for passenger cars were produced with a 3.0 mm underlayer prepared by vulcanisation of the reference underlayer composition (Ref. 1) and 2.5 mm according to the invention (Inv. composition 3), and subjected to driving tests. In the tables below, "PN1" indicates a comparative tyre comprising in the underlayer the elastomeric compound obtained from the Ref. composition 1 (shown in Table 1), while "PN2" indicates a tyre according to the invention comprising in the underlayer the elastomeric compound obtained from Inv. composition 3 (shown in Table 1).

The tyres, both front and rear, had a size of 215/50R18, with a 7"×18" rim and an inflation pressure of 2.3 bar (front) and 2.1 bar (rear). The dry and wet tests were carried out by equipping a Ford Puma car. The weight of the vehicle including the driver was 860 kg on the front and 561 kg on the rear. Braking tests and driving behaviour tests were carried out on dry and wet road surfaces.

The braking test was carried out with tyres fitted to a vehicle equipped with an anti-lock braking system (ABS), on a straight asphalt section both in dry and wet conditions, measuring the stopping distance from a predetermined initial speed, typically 100 km/h in dry conditions and 80 km/h in wet conditions.

The driving behaviour test, on dry or wet surfaces, was carried out on predefined routes, typically circuits closed to traffic. By simulating some typical maneuvers (such as changing lanes, overtaking, slalom between skittles, entering and exiting corners) performed at a constant speed, and in acceleration and deceleration, the test driver evaluated the tyre performance giving a numerical evaluation of the behaviour of the latter during the above maneuvers. These values represent an average value among those obtained in multiple test sessions (typically 5-6 tests) and provided by multiple testers (typically 2-3).

The results of the driving tests are shown in the following Tables 3 and 4 where the values of the scores were reparameterized by setting the values relating to the reference tyre PN1 equal to 100. In these tables, a score above 100 indicated an improvement over the reference and a score of at least 105 an improvement not only perceived by the test driver but also by a normal driver.

TABLE 3

| tests on dry asphalt (T 13-20° C.) | | |
|---|---|---|
| | PN1 (Ref.) | PN2 (Inv.) |
| COMFORT | | |
| Vertical compactness/Impact strength | 100 | 100 |
| Vertical damping | 100 | 100 |
| Perception of ease of rolling (20-50 Hz) | 100 | 100 |
| Rolling noise | 100 | 100 |
| STEERING ITEMS | | |
| Response window | 100 | 110 |
| Gain/Delay/Ant/Post offset in response | 100 | 105 |
| Linearity/Lateral Force Growth/Torque Growth | 100 | 105 |
| Connection between steering wheel and tyre/Accuracy | 100 | 105 |
| DYNAMIC MANEUVERS | | |
| Driving to the limit/Response/Grip | 100 | 110 |
| Progressivity in loss of grip/Recovery | 100 | 105 |
| Balance (under/oversteer)/Stability when cornering | 100 | 105 |
| Sensitivity to release | 100 | 105 |
| Lane change/transient stability | 100 | 105 |

From the results shown in Table 3 it was highlighted that the driving performance of the tyre according to the invention PN2, the underlayer of which consisted of the Inv. 3 compound, on a dry road surface, had improved with respect to those of the reference tyre PN1.

In particular, an improvement in behaviour was observed in all working conditions of the tyre, from the steering response both on straight lines and in curves, in conditions of low engagement (soft handling) and reaching the limit and beyond (hard handling), including the ability to manage the grip limit and recover trim in the event of an emergency maneuver.

Furthermore, the tyre according to the invention PN2 maintained the comfort performance of the reference tyre PN1 as regards both the impact with the obstacle and the damping.

TABLE 4

| wet driving tests (air T 14° C., asphalt 24° C., water 18-19° C.) | | |
|---|---|---|
| | PN1 (Ref.) | PN2 (Inv.) |
| Acceleration in a straight lane | 100 | 100 |
| Straight lane braking | 100 | 100 |
| Response for corner entry | 100 | 100 |
| Lateral grip | 100 | 100 |
| Understeer | 100 | 110 |
| Oversteer | 100 | 90 |
| Stability when cornering | 100 | 90 |
| Acceleration when cornering | 100 | 100 |
| Recovery | 100 | 100 |

The results shown in Table 4 show that the driving performance in challenging conditions, on a wet road surface, of the tyre according to the invention PN2, the underlayer of which consisted of the Inv. Compound 3, were substantially comparable to those of the reference tyre PN1, despite the significant reduction in RR, measured in Example 3.

Example 3: Determination of the Rolling Resistance Index

In accordance with the ISO 28580:2018 standard, the RR coefficients of tyres according to the invention (PN2) and comparative (PN1), shown in the following Table 5, were measured:

TABLE 5

| | | Underlayer thickness | Average tyre weight Kg | RR coefficient |
|---|---|---|---|---|
| PN1 | Ref. | 3 mm | 9.53 | 5.51 N/kN |
| PN2 | Inv. | 2.5 mm | 9.50 | 5.32 N/kN |

As can be seen from the data reported in Table 5, the tyre according to the invention PN2 was characterised by a considerable decrease (−3.4%) in the RR coefficient. Unexpectedly, this significant reduction was associated with maintaining or even improving driving performance, as highlighted in Tables 3 and 4 above.

It should be noted that the RR coefficient value of the tyre PN2 was significantly below the minimum threshold of class A (6.5 N/kN) established by the European standard, thus placing the tyre of the invention among the best tyres in the ULRR (Ultra Low Rolling Resistance) category.

Furthermore, it was observed that the tyre object of the invention PN2 improved the RR with respect to the already excellent value of the reference tyre PN1 with a lower underlayer thickness (2.5 vs 3 mm), thus resulting in the possibility of developing ULRR tyres with an advantageously reduced weight.

In conclusion, the examples described herein show that the particular compounds for underlayer, characterised by very low values of G', E" and Tan delta moduli and high E', gave rise to a significant reduction of the hysteresis while maintaining the braking performance and, unexpectedly, gave the tyre of the invention better overall driving performance, especially in the features of perception and reaction to the steering inputs, and in the behaviour in both low and high engagement conditions, up to the limit of grip.

Therefore, the tyre according to the invention is suitable for meeting the need to significantly reduce the fuel consumption of cars and to advantageously increase the recharging interval of electric vehicles, while maintaining or even improving the driving performance and comfort of known tyres.

The invention claimed is:

1. A tyre for vehicle wheels comprising:
   a carcass structure having opposing side edges associated with respective annular anchoring structures;
   a belt structure located in a position radially external to the carcass structure;
   a tread band located in a position radially external to the belt structure;
   a pair of sidewall structures, wherein each sidewall structure comprises a sidewall extended in a position axially external to the carcass structure and extended radially between one of the annular anchoring structures and an axially external portion of the tread band; and
   at least one underlayer, wherein the underlayer is in a radially internal position with respect to the tread band and radially external with respect to the belt structure, and wherein the at least one underlayer is positioned in contact with the tread band along its entire axial length,
   wherein the at least one underlayer comprises a vulcanised elastomeric compound having a shear modulus value G', measured with a Rubber Process Analyzer (RPA) at 70° C., 10 Hz, 9% strain, of less than 0.90 MPa, a dynamic elastic compression modulus value E' ranging from 3.00 MPa to 8.00 MPa, and a dynamic viscous compression modulus value E" of less than 0.24 MPa,
   wherein the moduli E' and E" are measured at 23° C. with an Instron model 1341 dynamic device in a tension-compression mode on cylindrical samples of 25 mm in length and 14 mm in diameter, cross-linked at 170° C. for 10 minutes, longitudinally pre-compressed by 25% and subjected to a dynamic sinusoidal stress of ±3.5% of amplitude and 10 Hz of frequency.

2. The tyre according to claim 1, wherein the vulcanised elastomeric compound has a shear modulus value G' of less than 0.87 MPa, a dynamic elastic compression modulus value E' ranging from 3.50 MPa to 7.50 MPa, and a dynamic viscous compression modulus value E" of less than 0.23 MPa.

3. The tyre according to claim 1, wherein the tyre has one underlayer.

4. The tyre according to claim 1, wherein the at least one underlayer comprises at least 50%, 60%, 70%, or 80%, by weight of the vulcanised elastomeric compound.

5. The tyre according to claim 4, wherein the at least one underlayer comprises at least 90%, by weight of the vulcanised elastomeric compound.

6. The tyre according to claim 1, wherein the vulcanised elastomeric compound of the at least one underlayer comprises, before vulcanisation, an elastomeric composition comprising:

−100 phr of at least one diene elastomeric polymer, one or more reinforcing fillers in a total amount of not more than 25 phr, wherein the one or more fillers comprise at least 5 phr of optionally modified silicate fibres with needle-shaped morphology of nanometric dimensions, and at least 0.1 phr of at least one vulcanisation agent.

7. The tyre according to claim 6, wherein the 100 phr of at least one diene elastomeric polymer of the composition comprises:

from 70 phr to 100 phr of a synthetic or a natural polyisoprene, or mixtures thereof, and from 0 phr to 30 phr of a polybutadiene.

8. The tyre according to claim 6, wherein the composition comprises one or more reinforcing fillers in a total amount of less than 20%, 18%, or 16%, by weight with respect to the total weight of the composition.

9. The tyre according to claim 6, wherein the composition comprises one or more reinforcing fillers in a total amount of not more than 25 phr and not less than 10 phr, and wherein the fillers comprise at least 6 phr of optionally modified silicate fibres with needle-shaped morphology of nanometric dimensions.

10. The tyre according to claim 6, wherein the one or more reinforcing filler comprises a mixture of silica and optionally modified silicate fibres with needle-shaped morphology of nanometric dimensions.

11. The tyre according to claim 10, wherein the silica and the optionally modified silicate fibres with needle-shaped morphology of nanometric dimensions are present in a weight ratio of between 0.5:1 and 5:1.

12. The tyre according to claim 11, wherein the silica and the optionally modified silicate fibres with needle-shaped morphology of nanometric dimensions are present in a weight ratio between 0.7:1 and 5:1.

13. The tyre according to claim 12, wherein the silica and the optionally modified silicate fibres with needle-shaped morphology of nanometric dimensions are present in a weight ratio between 0.8:1 and 3:1.

14. The tyre according to claim 13, wherein the silica and the optionally modified silicate fibres with needle-shaped morphology of nanometric dimensions are present in a weight ratio between 0.9:1 and 1.1:1.

15. The tyre according to claim 6, wherein the one or more reinforcing fillers comprises carbon black.

16. The tyre according to claim 6, wherein the one or more reinforcing filler comprises from 0 phr to 15 phr of carbon black, from 5 to 20 phr of silica, and from 5 phr to 20 phr of optionally modified silicate fibres with needle-shaped morphology of nanometric dimensions.

17. The tyre according to claim 6, wherein the silicate fibres with needle-shaped morphology of nanometric dimensions are optionally modified sepiolite fibres.

18. The tyre according to claim 1, wherein the vulcanised elastomeric compound of the underlayer has a Tan Delta value lower than 0.065, measured with the RPA at 70° C., 10 Hz, 9% strain.

19. The tyre according to claim 18, wherein the vulcanised elastomeric compound of the underlayer has a Tan Delta value lower than 0.060.

20. The tyre according to claim 19, wherein the vulcanised elastomeric compound of the underlayer has a Tan Delta value lower than 0.055.

* * * * *